US006822042B2

(12) United States Patent
Capps

(10) Patent No.: US 6,822,042 B2
(45) Date of Patent: Nov. 23, 2004

(54) SACCHARIDE-BASED RESIN FOR THE PREPARATION OF COMPOSITE PRODUCTS

(75) Inventor: Charles L. Capps, Little Rock, AK (US)

(73) Assignee: Temple-Inland Forest Products Corporation, Austin, TX (US)

( * ) Notice: Subject to any disclaimer, the term of this patent is extended or adjusted under 35 U.S.C. 154(b) by 0 days.

(21) Appl. No.: 10/279,326

(22) Filed: Oct. 24, 2002

(65) Prior Publication Data

US 2003/0134945 A1 Jul. 17, 2003

Related U.S. Application Data

(60) Provisional application No. 60/335,945, filed on Oct. 24, 2001.

(51) Int. Cl.$^7$ .............................. C08J 3/00; C08K 3/20; C08L 75/00; B32B 21/02; B32B 21/10
(52) U.S. Cl. ................. 524/590; 428/423.1; 428/292.4; 428/425.1; 521/84.1; 521/109.1; 521/137; 521/155; 521/161; 521/170; 521/175; 524/589; 524/591; 524/839; 524/840; 527/103; 527/301; 527/401; 528/44; 528/73; 528/76; 528/85
(58) Field of Search ................................ 524/589, 590, 524/591, 839, 840; 528/44, 73, 76, 85; 521/84.1, 109.1, 137, 155, 161, 170, 175; 527/301, 103, 401; 428/423.1, 292.4, 425.1

(56) References Cited

U.S. PATENT DOCUMENTS

| | | | |
|---|---|---|---|
| 3,637,539 A | 1/1972 | Wolff et al. ................. 260/2.5 |
| 3,666,593 A | 5/1972 | Lee .............................. 156/285 |
| 3,747,037 A | 7/1973 | Earing ........................... 336/96 |
| 3,870,665 A | 3/1975 | Diehr et al. ................. 260/17.2 |
| 3,919,173 A | 11/1975 | Coyner et al. .............. 260/77.5 |
| 3,923,926 A | 12/1975 | Harada et al. .............. 260/77.5 |
| 4,100,328 A | 7/1978 | Gallagher ..................... 428/407 |
| 4,123,412 A | 10/1978 | Fukuda et al. .............. 260/30.8 |
| 4,143,014 A | 3/1979 | McLaughlin et al. ....... 260/29.2 |
| 4,169,826 A | 10/1979 | Gilbert et al. ............... 260/33.6 |
| 4,257,817 A | 3/1981 | Mathur et al. ............... 106/266 |
| 4,257,995 A | 3/1981 | McLaughlin et al. ........ 264/122 |
| 4,291,129 A | * 9/1981 | Kennedy |
| 4,314,916 A | 2/1982 | Blount ........................... 260/13 |
| 4,316,745 A | 2/1982 | Blount .................... 106/287.34 |
| 4,317,752 A | 3/1982 | Blount ........................... 521/159 |
| 4,323,494 A | 4/1982 | Blount ........................... 524/858 |
| 4,324,864 A | 4/1982 | Blount ........................... 521/100 |
| 4,328,136 A | 5/1982 | Blount ........................... 523/204 |
| 4,337,710 A | 7/1982 | Haataja et al. .............. 108/53.3 |
| 4,357,430 A | 11/1982 | VanCleve ...................... 521/128 |
| 4,359,507 A | 11/1982 | Gaul et al. ................. 428/425.1 |
| 4,361,662 A | 11/1982 | Gaul et al. ..................... 524/14 |
| 4,377,646 A | 3/1983 | Blount ........................... 521/154 |
| 4,378,441 A | 3/1983 | Blount ........................... 521/154 |
| 4,393,019 A | 7/1983 | Geimer ........................... 264/83 |
| 4,414,361 A | 11/1983 | Gaul et al. ..................... 524/702 |
| 4,427,002 A | 1/1984 | Baron et al. ..................... 128/83 |
| 4,486,557 A | 12/1984 | Gaul et al. ..................... 523/446 |
| 4,490,518 A | 12/1984 | Fuzesi et al. ................ 527/401 |
| 4,517,147 A | 5/1985 | Taylor et al. .................. 264/83 |
| 4,521,544 A | * 6/1985 | Kennedy |
| 4,525,321 A | 6/1985 | Tonniges ..................... 264/517 |
| 4,530,777 A | * 7/1985 | Kennedy |
| 4,546,039 A | 10/1985 | Horacek et al. ............. 428/357 |
| 4,609,513 A | 9/1986 | Israel ........................... 264/122 |
| 4,617,223 A | 10/1986 | Hiscock et al. .............. 428/211 |
| 4,652,595 A | 3/1987 | Peters et al. ................. 523/315 |
| 4,684,489 A | 8/1987 | Walter ......................... 264/101 |
| 4,692,292 A | 9/1987 | Kollmeier et al. .......... 264/126 |
| 4,692,479 A | 9/1987 | Schneider et al. .......... 523/209 |
| 4,720,513 A | 1/1988 | Kameyama et al. ........ 523/203 |
| 4,752,637 A | 6/1988 | Israel ........................... 524/702 |
| RE32,801 E | 12/1988 | Peters et al. ................. 523/315 |
| 4,801,631 A | 1/1989 | Sachs et al. ................... 524/18 |
| 4,833,182 A | 5/1989 | Israel et al. .................... 524/14 |
| 4,850,849 A | 7/1989 | Hsu ............................. 425/407 |
| 4,898,776 A | 2/1990 | Israel et al. .................. 428/336 |
| 4,906,484 A | 3/1990 | Lambuth et al. ............ 428/326 |
| 4,944,823 A | 7/1990 | Stofko .......................... 156/283 |

(List continued on next page.)

FOREIGN PATENT DOCUMENTS

| | | | |
|---|---|---|---|
| CA | 1087825 | 10/1980 | |
| CA | 2043331 | 5/1991 | |
| DE | 27 03 271 A1 | 3/1978 | ........... C08L/75/04 |
| DE | 04331656 | 9/1994 | |
| FR | 2 259 134 | 8/1975 | ........... C08L/75/04 |
| GB | 1387454 | 3/1975 | |
| JP | 60287794 | 6/1987 | |
| JP | 02123006 | 1/1992 | |
| WO | WO 83/02120 | 6/1983 | |
| WO | WO8803090 | 5/1988 | |

OTHER PUBLICATIONS

*Technology of Rice Straw Particleboard Bonded by Urea–Formaldehyde Resin Modified by Isocyanate*, Liu Zhengtian and Hao Bingye, Pacific Rim Bio–Based Composites Symposium, Nov. 1992, pp. 295–302, Beijing Forestry University, Beijing, China.

*Chemical and Physical Interpretation of MDI Cure in Saturated Steam Environments*, David Harper, Michael Wolcott, Timothy Rials, 2$^{nd}$ European Panel Products Symposium, pp. 193–204, Department of Civil and Environmental Engineering, Washington State University, Pullman, Washington.

PCT International Search Report, Feb. 24, 2003.

*Primary Examiner*—Patrick D. Niland
(74) *Attorney, Agent, or Firm*—Conley Rose, P.C.; Rodney B. Carroll

(57) ABSTRACT

A novel resin for binding composite lignocellulosic, cellulosic and non-cellulosic products is disclosed. The resin is comprised of one or more isocyanates, one or more saccharides, one or more polyols, and water. Preferaby, the saccharide is a polysaccharide comprised of corn syrup. Preferably, the isocyanate is a polyisocyanate and the polyol is an ethylene glycol. Also disclosed are methods for preparing and applying the resin as well as the products prepared from the resin.

27 Claims, No Drawings

U.S. PATENT DOCUMENTS

| | | | |
|---|---|---|---|
| 5,001,190 A | 3/1991 | Carpenter et al. | 524/871 |
| 5,002,713 A | 3/1991 | Palardy et al. | 264/109 |
| 5,008,310 A | 4/1991 | Beshay | 524/13 |
| 5,053,274 A | 10/1991 | Jonas | 428/332 |
| 5,075,370 A | 12/1991 | Kubitza et al. | 524/591 |
| 5,128,407 A | 7/1992 | Layton et al. | 524/839 |
| 5,140,086 A | 8/1992 | Hunter et al. | 527/103 |
| 5,143,768 A | 9/1992 | Wilderman et al. | 428/68 |
| 5,151,238 A | 9/1992 | Earl et al. | 264/136 |
| 5,179,143 A | 1/1993 | Konig et al. | 524/35 |
| 5,180,770 A | 1/1993 | Lepori et al. | 524/563 |
| 5,183,837 A | 2/1993 | Lepori et al. | 524/13 |
| 5,204,176 A | 4/1993 | Seiss et al. | 428/304.4 |
| 5,214,081 A | 5/1993 | Lepori et al. | 524/35 |
| 5,332,458 A | 7/1994 | Wallick | 156/210 |
| 5,387,642 A | 2/1995 | Blum et al. | 524/591 |
| 5,407,980 A | 4/1995 | Pizzi et al. | 524/73 |
| 5,426,137 A | 6/1995 | Allen | 523/318 |
| 5,554,330 A | 9/1996 | Flannery et al. | 264/113 |
| 5,641,819 A | 6/1997 | Campbell | 524/14 |
| 5,648,421 A | 7/1997 | Thiele et al. | 524/789 |
| 5,674,568 A | 10/1997 | Layton et al. | 427/389.9 |
| 5,750,201 A | 5/1998 | Phanopoulos et al. | 427/375 |
| 5,942,058 A | 8/1999 | Sleeter et al. | 156/62.2 |
| 5,968,995 A * | 10/1999 | Rizk et al. | |
| 6,022,444 A | 2/2000 | Haider et al. | 156/331.4 |
| 6,197,912 B1 | 3/2001 | Huang et al. | 528/28 |
| 6,287,495 B1 | 9/2001 | Rosthauser | 264/109 |

\* cited by examiner

SACCHARIDE-BASED RESIN FOR THE PREPARATION OF COMPOSITE PRODUCTS

CROSS-REFERENCE TO RELATED APPLICATIONS

The present application claims the benefit of U.S. provisional application Ser. No. 60/335,945, filed Oct. 24, 2001, and entitled "Saccharide-Based Resin for the Preparation of Composite Products," which is hereby incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present invention relates in general to the composition, preparation and application of a high quality adhesive composition for lignocellulosic, cellulosic and non-cellulosic materials. More particularly, the present invention relates to the composition, preparation and application of a saccharide-based adhesive resin for composite wood products, other lignocellulosic materials, and non-cellulosic materials. Even more particularly, the present invention relates to the composition, preparation and application of an adhesive resin containing corn syrup, water, isocyanate and polyol that is useful in the preparation of particle board and medium density fiberboard.

2. Background Art

Composite wood products prepared from various lignocellulosic materials (e.g., wood) have been known for centuries, although industrial production began only about a century ago. Among other things, these products offer a relatively low cost and a reasonably high strength to weight ratio. Consequently, they are used in a number of capacities including interior and exterior construction, furniture and even marine applications. Several distinct composite wood products exist including plywood, oriented strand board, particleboard and medium density fiberboard (MDF).

Products such as particleboard and MDF are typically prepared from an adhesive resin composition and comminuted lignocellulosic materials such as wood flakes or wood fibers. The manufacture of particleboard and MDF begins with the reduction of the wood particles to a particulate size or a fiber, which will occasionally be referred to herein as a furnish. This furnish is then blended with an adhesive resin and transported to a forming device, which shapes the mixture into a mat. The mat is then loaded into a heated press that shapes and pressurizes the mat to a desired thickness. The pressure and heat together act to cure the resin, which bonds the mixture into a panel or board. Bonding performance is affected by, among other factors, the amount and type of resin, the curing time and the curing pressure.

The predominant resin systems in the composite wood industry are urea-formaldehyde (UF) and phenol-formaldehyde (PF) resins. Although these formaldehyde-based resins perform consistently, the physical properties of composite wood products prepared with formaldehyde-based resins are often unsatisfactory. For example, the internal bond strength of composite wood products frequently renders them unfit for certain demanding applications. In addition, such products are commonly susceptible to significant swelling upon exposure to moisture. As a consequence of these and other factors, composite wood products prepared with UF and PF resins are often less robust than desired.

Currently, alternatives to formaldehyde-based resins are being investigated. The potentially attractive alternatives include resin systems that employ isocyanates. Such resin systems have been shown to impart markedly improved physical properties to composite wood products. For example, concentrated isocyanate-based resins increase bonding strength, and therefore offer a more robust and durable composite wood product. Unfortunately, isocyanate-based resins also have several known drawbacks that have limited their commercial utility. First, isocyanates are relatively expensive as compared to other resin materials. Consequently, concentrated isocyanate-based resins are uneconomical as compared with traditional formaldehyde-based resins. Second, unlike UF and PF resins, isocyanates are highly reactive with water. Consequently, isocyanates react quickly with any water present in either the wood furnish or the resin itself. This limits both the shelf-life of the resin and the lignocellulosic materials with which it can be used. Third, isocyanates are toxic and their use creates environmental, health and industrial hygiene concerns. Thus, process safety considerations influence against the use of concentrated isocyanate-based resins.

The chemistry of isocyanate binding of lignocellulosic materials is not well understood. However, it is well known that isocyanates react with the hydroxyl moiety on alcohols to give urethanes and that polyisocyanates react with polyalcohols (hereinafter Urethane Formation

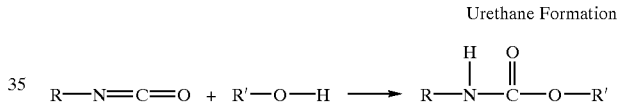

"polyols") to give polyurethanes. Because lignocellulosic materials have surface-terminated hydroxyl groups, it is commonly believed that isocyanates serve as an effective binder by forming urethane linkages with the lignocellulosic materials. It is also well known that isocyanate moieties react with water to yield less reactive ureas and carbon dioxide. Consequently, water is believed to damage the efficacy of the binder by reducing the availability of reactive isocyanate groups.

Urea Formation

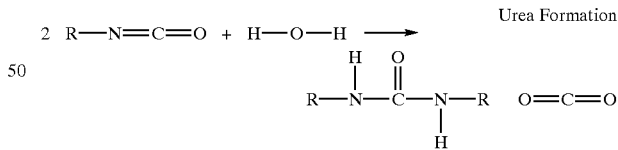

The composite wood industry needs an improved resin capable of providing adequate physical properties while overcoming the limitations of the prior art. The improved resin should offer strong bonding, low cost, adequate shelf-life, and adequate process safety. Other objects and advantages of the invention will appear from the following description.

SUMMARY OF THE PREFERRED EMBODIMENTS

The preferred embodiments of the present invention comprise a novel resin for binding lignocellulosic, cellulosic and non-cellulosic materials into composite products. The components of the resin include one or more saccharides, polyisocyanates, and polyols in aqueous media. More particularly, some of the preferred embodiments of the present invention comprise a novel resin comprised primarily of saccharide with isocyanate, polyol and water as minor constituents. The preferred embodiments of the present invention also comprise a method for preparing the resin prior to its application to various lignocellulosic, cellulosic and non-cellulosic materials. The preferred embodiments of the present invention further comprise a method of applying the resin to various lignocellulosic, cellulosic and non-cellulosic materials to produce composite products such as particleboard and medium density fiberboard. In addition, the preferred embodiments of the present invention comprise the composite products prepared using the resin.

DESCRIPTION OF THE PREFERRED EMBODIMENTS

The preferred embodiments of the present invention stem from the discovery that an appropriate resin composition of saccharide, isocyanate, polyol and water overcomes many of the prior art limitations of isocyanate-containing adhesive resins without sacrificing their superior bond strength. In particular, suitable and even extraordinary binding can be achieved with resins having very low concentrations of isocyanate by using a saccharide, such as corn syrup, as a primary resin ingredient. It is believed that the polyol acts to retard the reaction between isocyanate and water, thereby increasing the shelf-life of the resin.

As is described below, the resin is useful for lignocellulosic, cellulosic and non-cellulosic materials. Lignocellulosic materials typically are comprised of cellulose, hemicellulose and lignin. Without limiting the scope of the invention, lignocellulosic materials include woody biomass, energy crops, and wood construction materials. The present resin is also useful with non-cellulosic materials. Without limiting the scope of the present invention, non-cellulosic materials include plastics, polyurethanes, organic polymer systems and some metals.

According to this disclosure and the examples set forth herein, a resin prepared from appropriate relative quantities of saccharide, isocyanate, polyol and water allows the manufacture of composite products having desired physical properties. Typically, water is used to adjust the final solids contents of the resin composition to achieve a resin that meets the requirements for processing equipment used in product manufacturing. As used herein, solids content refers to the weight percentage of resin components other than water (i.e., resin solids) to the total weight of the resin (i.e., resin solids and water).

Isocyanates useful in the current invention include those that perform as suitable building blocks in polyurethane chemistry such as aromatic, aliphatic, or cycloaliphatic polyisocyanates having at least two active isocyanate groups per molecule. The isocyanate utilized in the testing below is Mondur 541, a commercially available diphenylmethane diisocyanate, a polyisocyanate. However, a person of ordinary skill in the art will immediately recognize that numerous chemicals may be used as the isocyanate in the present invention. Without limiting the scope of the invention, representative examples include 2,4- and 2,6-diisocyanatotoluene (TDI) and their derivatives; methylenediphenyl 4,4'-, 2,4- and 2,2'-diisocyanates (MDI) and their derivatives; industrial products which may additionally comprise products having more than one ring (polymeric MDI's or PMDI); 1,5-naphthalene diisocyanate (NDI); 4,4', 4"-triisocyanatotriphenylmethane and bis(3,5-diisocyanato-2-methylphenyl)methane; 1,6-hexamethylene diisocyanate (HDI); and 3-isocyanatomethyl-3,5,5-trimethylcyclohexyl (isophorone) isocyanate (IPDI). Many such isocyanates are available commercially. For example, commercially available isocyanates include, but are not limited to, IsoBind 1088 (Dow Chemical), Isonate 143L (Dow Chemical), PAPI (Dow Chemical), Mondur 541 (Bayer), Lupranate (BASF), and Rubinate (ICI/Huntsman). Furthermore, basic polyisocyanates may also be modified by bi- or trimerization to produce carbodiimides, uretdiones, biurets, and allophanates. The one or more isocyanates are preferably present in the resin composition in an amount ranging from about 1 to about 30 weight percent of the resin, more preferably from about 2 to about 20 weight percent of the resin, and most preferably from about 5 to about 20 weight percent of the resin.

The term "polyol" in the present invention is defined as a compound having at least two hydroxyl groups capable of reacting with a polyisocyanate. The polyol utilized in the testing below is 1,2-propylene glycol, a relatively simple molecule having two hydroxyl groups. However, a person of ordinary skill in the art will immediately recognize that numerous chemicals may be used as the polyol in the present invention. Without limiting the scope of the invention, representative examples include ethylene glycol; 1,3-propylene glycol; hexane 1,6-diol; 2 methyl-1,3-propanediol; glycerol; mannitol; sorbitol; diethylene glycol; triethylene glycol; polyethylene glycols; polypropylene glycols; and butylene, dibutylene, and polybutylene glycols. The one or more polyols are preferably present in the resin composition in an amount ranging from about 1 to about 10 weight percent of the resin, more preferably from about 2 to about 10 weight percent of the resin, and most preferably from about 3 to about 5 weight percent of the resin.

Saccharides are members of the carbohydrates family, a class of molecules comprising polyhydroxyaldehydes and polyhydroxyketones. Saccharides range from relatively small, simple monosaccharides such as glucose to much larger, more complex polysaccharides such as cellulose. A common aspect of all saccharides is the presence of multiple hydroxyl groups and at least one aldehyde or ketone functionality. The saccharide utilized in the testing below is corn syrup, a mixture of various chain length saccharides produced by hydrolyzing the polysaccharides in corn starch. Corn syrup contains aldohexoses, ketohexoses, and a number of other saccharides that contain varying numbers of hydroxyl, aldehyde and ketone groups. Corn syrup is the only saccharide mixture utilized in the examples below. However, one of ordinary skill in the art will understand that references to corn syrup are exemplary only and that other saccharides and saccharides mixtures may perform equally well or better than corn syrup in the present invention. For example, such saccharides may include individual mono-, di-, oligo- and polysaccharides as well as mixtures produced either synthetically or from natural products such as vegetable starches. Furthermore, although the present experiments utilized corn syrup obtained from Cargill, Inc., there is no reason to believe that the source of corn syrup is critical to the results obtained below. Consequently, one of ordinary skill in the art will understand that the present invention encompasses the use of saccharides irrespective of source. The one or more saccharides are preferably present in the resin composition in an amount ranging from about 25 to about 65 weight percent of the resin, more preferably from about 40 to about 65 weight percent of the resin, and most preferably from about 50 to about 65 weight percent of the resin.

In one embodiment of the present invention, the resin is composed of approximately 10 weight percent Mondur 541 isocyanate; 5 weight percent 1,2-propylene glycol; and appropriate quantities of water and corn syrup necessary to create a resin having approximately sixty-five weight percent solids content. Thus, as depicted in Table 1, one method of preparing

TABLE 1

One Resin Formulation

| | Percent By Weight of Final Composition | Percent Solids in Component | Contribution to Percent Solids in Final Composition |
|---|---|---|---|
| Mondur 541 | 10 | 100 | 10 |
| 1,2-Propylene Glycol | 5 | 100 | 5 |
| Corn Syrup | 64 | 80 | 51.2 |
| Water | 21 | 0 | 0 |
| | | Total Solids | 66.2 | this embodiment consists of mixing an amount of one-hundred percent solids content isocyanate equal to 10 weight percent of the final resin composition; an amount of 1,2 propylene glycol equal to 5 weight percent of the final resin composition; an amount of eighty percent solids corn syrup equal to 64 weight percent of the final resin composition; and an amount of water equal to 21 weight percent of the final resin composition. The order of mixing is discussed below.

Corn syrups of varying solids content can be utilized in the present invention. For example, as depicted in Table 2, an approximately sixty-five percent solids content resin can also

TABLE 2

Alternative Resin Formulation

| | Percent By Weight of Final Composition | Percent Solids in Component | Contribution to Percent Solids in Final Composition |
|---|---|---|---|
| Mondur 541 | 10 | 100 | 10 |
| 1,2-Propylene Glycol | 5 | 100 | 5 |
| Corn Syrup | 74 | 70 | 51.8 |
| Water | 11 | 0 | 0 |
| | | Total Solids | 66.8 | be achieved by mixing an amount of one-hundred percent solids content isocyanate equal to 10 weight percent of the final resin composition; an amount of 1,2-propylene glycol equal to 5 weight percent of the final resin composition; an amount of seventy percent solids corn syrup equal to 74 weight percent of the final resin composition; and an amount of water equal to 11 weight percent of the final resin composition. According to another preferred embodiment, the resin is comprised of 5 percent by weight polyol, 15 percent by weight isocyanate, 50 percent by weight of an 80 percent solids (20 percent water) corn syrup, and 30 percent by weight additional water.

While the invention is susceptible to various modifications and alternative forms, specific embodiments thereof are shown by way of example and will herein be described in detail. It should be understood, however, that the examples are not intended to limit the invention to the particular form disclosed, but on the contrary, the intention is to cover all modifications, equivalents and alternatives falling within the spirit and scope of the present invention as defined by the claims.

EXAMPLES

General Procedure for Resin Preparation

Saccharide-based resins of varying formulations were prepared from saccharide, isocyanate, 1,2-propylene glycol and water. The saccharide component of each of these resins was Cargill 80 percent solids content corn syrup. The isocyanate in each case was Mondur 541. Unless otherwise specified, the following procedure was used. First, the appropriate quantity of isocyanate was measured and poured into a blending unit. Then, the appropriate amount of 1,2-propylene glycol was measured and mixed with the isocyanate until a homogeneous appearance is observed. Next, the appropriate amount of saccharide was measured and added to the mixture. Finally, any required amount of water was measured and added to the mixture. The entire mixture was blended for thirty seconds and was then ready for use. Although different orders of mixing are within the scope of the invention, preferably the water and isocyanate are not combined without the presence of the polyol.

A urea-formaldehyde (UF) resin was used to prepare conventional particleboard samples for comparative purposes. The UF resin was a commercially available product having a 1.1:1 mole ratio of urea to formaldehyde and an approximately sixty-two percent solids content so as to correspond as closely as possible to the saccharide resins.

General Procedure for Particleboard Production

Unless otherwise specified, the processing of the fiber to make particleboard was as follows. First, an appropriate amount of comminuted Southern pine particles necessary to achieve the desired target density, which was 48 pounds per cubic foot (pcf) unless otherwise specified, was weighed and tested for moisture content on a CSC Moisture Balance. The particles were then loaded into a fiber blender and the resin was applied by pouring it onto the particles. In each case, enough resin was used to create a seven weight percent resin load—i.e., enough resin to make up seven weight percent of the final weight of the furnish. The blender was activated for a period of sixty seconds. Upon completion of blending, the resinated particles were removed and poured into a former, in which a mat was formed. The mat, supported on top and bottom by a caul plate, was then loaded into a preheated hydraulic press maintained at 350° F. The mat was compressed to the desired thickness and pressure was maintained for a period of two minutes, unless otherwise specified below. At the conclusion of the press cycle, pressure was relieved gradually so as not to disrupt the board. The boards were then allowed to cool and were cut to specified sizes for specific physical tests.

General Procedure for Analytical Testing

The finished boards were generally tested for one or more parameters. Physical strength tests consisted of measurements of internal bond, modulus of elasticity, and/or modulus of rupture. In general, higher values of internal bond, modulus of rupture and modulus of elasticity are associated with a higher quality, more robust composite product. In each case the testing of the boards was performed according to ASTM Standard D1037. Some boards were also tested for edge swelling after exposing the board to moisture.

Example 1

Several resin formulations were prepared according to the above procedure and used to prepare particleboard samples for testing. In addition, particleboard samples were prepared from the UF resin described above (hereinafter "Resin 1") for comparison testing. The formulations for Resins 2 through 7 are listed in Table 3. Each contained 80 grams of corn syrup and varying quantities ("in grams") of isocyanate, 1,2-propylene glycol, polyvinyl alcohol, and water.

Except for Resin 2, which tested the effect of adding polyvinyl alcohol to the resin, the saccharide resins each contained 10 grams of isocyanate. Resins 3, 4 and 7 differed in composition from Resins 5 and 6 in their respective concentrations of 1,2-propylene glycol and

TABLE 3

Resin Components Measured in Grams

|  | Corn Syrup | Isocyanate | Propylene Glycol | Polyvinyl Alcohol | Water |
|---|---|---|---|---|---|
| Resin 2 | 80 | 5 | 10 | 5 | 0 |
| Resin 3 | 80 | 10 | 5 | 0 | 37 |
| Resin 4 | 80 | 10 | 5 | 0 | 37 |
| Resin 5 | 80 | 10 | 10 | 0 | 32 |
| Resin 6 | 80 | 10 | 10 | 0 | 32 |
| Resin 7 | 80 | 10 | 5 | 0 | 37 | water. Resins 3, 4 and 7 each had 5 grams of 1,2-propylene glycol and 37 grams of added water whereas Resins 5 and 6 had 10 grams of 1,2-propylene glycol and a commensurately lower quantity of water.

Although the compositions of Resins 3 and 4 were the same as Resin 7, they were mixed differently. The components of Resins 3 and 4 were mixed simultaneously whereas the components in Resin 7 were mixed according to the procedure described above: namely, 1,2-propylene glycol was added to the isocyanate followed by the corn syrup and then water. Resin 3 differed from Resin 4 in that particleboards prepared from Resin 3 were subjected to a two-and-one-half minute press time rather than just two minutes.

The testing of the boards was performed according to ASTM Standard D1037 and each sample was tested for internal bond strength, modulus of elasticity, and modulus of rupture. The results are depicted in Table 4. For each resin tested, multiple boards were prepared and in each case both an average and the standard deviation are reported. The raw data is provided in Appendices 1 and 2. The results of this series of testing clearly demonstrate that the saccharide resins of the present invention provide particleboard products with physical characteristics

TABLE 4

Measured Physical Properties of Particleboard Products

| Resin Used to Prepare Particleboard | Internal Bond (psi) | Modulus of Rupture (psi) | Modulus of Elasticiy (psi) |
|---|---|---|---|
| Resin 1 | 69.5 ± 3.9 | 1,420.8 ± 144.9 | 349,283 ± 57,876 |
| Resin 2 | 127.2 ± 8.5 | 1,281.1 ± 360.6 | 275,507 ± 15,105 |
| Resin 3 | 181.7 ± 23.8 | 1,633.2 ± 168.9 | 291,684 ± 38,017 |
| Resin 4 | 175.1 ± 15.7 | 1,590.1 ± 20.9 | 372,365 ± 9,473 |

TABLE 4-continued

Measured Physical Properties of Particleboard Products

| Resin Used to Prepare Particleboard | Internal Bond (psi) | Modulus of Rupture (psi) | Modulus of Elasticiy (psi) |
|---|---|---|---|
| Resin 5 | 87.4 ± 12.8 | 1,521.6 ± 95.8 | 379,747 ± 6,641 |
| Resin 6 | 100.8 ± 11.4 | 1,647.5 ± 15.6 | 423,825 ± 6769 |
| Resin 7 | 286.9 ± 14.6 | 2,519.8 ± 38.3 | 415,202 ± 12,273 | superior to those of boards prepared with a Resin 1, the traditional UF resin. For example, the average internal bond strength achieved from Resins 2 through 7 uniformly surpassed that achieved from Resin 1 products. Furthermore, particleboard samples prepared with Resins 3 through 7 achieved a better average modulus of elasticity and modulus of rupture than particleboards prepared with UF resin with the exception of the modulus of elasticity for the particleboard samples prepared with Resin 3.

Particleboard samples prepared from Resins 5 and 6 exhibited less desirable physical characteristics than those achieved using Resins 3, 4 and 7. For example, the average internal bond strengths of wood product prepared using Resins 3, 4 and 7 were uniformly higher than those achieved using Resins 5 and 6. Furthermore, wood product prepared using Resin 7 provided significantly higher average modulus of elasticity and modulus of rupture than wood product prepared with Resins 5 and 6. Because the difference between Resin 7 and Resins 5 and 6 was the concentration of 1,2-propylene glycol—i.e, Resin 7 had 5 grams versus 10 grams in Resins 5 and 6—it is believed that the lower 1,2-propylene glycol level in Resin 7 results in improved particleboard characteristics.

As is evident from Table 4, particleboards prepared with Resin 7 displayed significantly better physical properties than boards prepared with Resins 3 and 4. In fact, the internal bond strength for Resin 7 products was more than fifty percent higher than those observed for Resin 3 and 4 products. Because all three resins had identical compositions, this result clearly emphasizes the importance of the order of component mixing. Apparently, by mixing the corn syrup and 1,2-propylene glycol with the isocyanate prior to adding water, it is possible to mitigate the reaction between water and isocyanate. Consequently, this manner of mixing is preferred.

The results achieved for products prepared from Resins 3 and 4 were quite similar. Because these resins differed only in the press time used during the manufacture of the particleboards, there is no reason to suspect that the present resins are susceptible to small changes in the manufacturing processing such as press times.

Example 2

To test the effect of both wood product density and isocyanate concentration on the wood product physical characteristics, several additional resins were prepared. As in Example 1, each of these resins was used to create wood product and this product was compared with wood product prepared using the previously described urea-formaldehyde resin. In all cases a seven weight percent resin loading was used. Resins E and F, the urea-formaldehyde resins, were identical to the urea-formaldehyde resin described in Example 1 above. The saccharide-based resin compositions are described in Table 5. Resin A was a saccharide-based resin having approximately 23 weight percent isocyanate. Resin B, in contrast, was prepared with approximately 7.5 weight percent isocyanate.

TABLE 5

Resin Components Measured in Grams

|  | Corn Syrup | Isocyanate | Propylene Glycol | Water |
| --- | --- | --- | --- | --- |
| Resin A | 42.5 | 30 | 5 | 54.5 |
| Resin B | 80 | 10 | 5 | 37 |
| Resin C | 80 | 10 | 5 | 37 |
| Resin D | 80 | 10 | 5 | 37 |

Resins C and D were identical to Resin 7 above in Example 1. However, the target densities of the particleboard products prepared with Resins C and D were different. The high density products prepared from Resin C had average densities of 49.18 pcf whereas the low density products prepared from Resin D had average densities of 44.06 pcf. Similarly, Resins E and F were identical to Resin 1 in Example 1, the UF resin. Again, the target densities of the composite wood products prepared with Resins E and F were different. The high density products prepared from Resin E had average densities of 48.16 pcf whereas the low density products prepared from Resin F had average densities of 42.96 pcf.

TABLE 6

Measured Physical Properties of Particleboards

| Resin Used to Prepare Particleboard | Modulus of Rupture (psi) | Modulus of Elasticity (psi) |
| --- | --- | --- |
| Resin A | 1,579.3 ± 172.8 | 308,801 ± 37,570 |
| Resin B | 1,699.2 ± 82.7 | 361,845 ± 12,894 |
| Resin C | 2,098.5 ± 18.6 | 428,733 ± 20,411 |
| Resin D | 1,564.7 ± 70.5 | 311,885 ± 6,133 |
| Resin E | 1675.3 ± 102.2 | 326,640 ± 4,079 |
| Resin F | 1,263.7 ± 209.4 | 251,515 ± 42,027 |

The testing of the boards prepared in Example 2 was performed according to ASTM Standard D1037 and each sample was tested for modulus of elasticity and modulus of rupture. The results are shown in Table 6. For each resin tested, multiple boards were prepared and in each case both an average and the standard deviation are reported. The results for particleboards prepared with Resin A and Resin B demonstrate that increasing the isocyanate concentration from approximately 7.5 to approximately 23 percent by weight does not result in an improved modulus of elasticity or modulus of rupture. In fact, increasing the isocyanate concentration in the resin resulted in a particleboard product having marginally poorer physical characteristics. The improved binding at low isocyanate concentration is ideal because reducing the isocyanate concentration not only decreases the cost of the resin but also alleviates environmental, health and industrial hygiene concerns. In view of this result, a preferred embodiment resin utilizes a lower—i.e., approximately 7.5 weight percent—concentration of isocyanate.

The particleboard products manufactured from Resins C and D were prepared as high and low density products, respectively, to test the effects of product density. As a comparison, the products manufactured from Resins E and F, the UF resin formulation, were also prepared as high and low density products. As is evident from Table 6, products prepared from both the saccharide-based resin and the UF resin achieve improved physical characteristics as product density is increased. Most importantly, the quality of particleboard prepared with the saccharide-based resin is superior to that prepared with UF resin at both low and high product density.

Example 3

As a further comparison, additional particleboard products were prepared according to the earlier described method using both the previously described UF resin and the saccharide-based resin described in Table 1. In both cases, the resin load was 7 percent by weight and the target density was 48 pcf.

The testing of the boards was performed according to ASTM Standard D1037 and each sample was tested for modulus of elasticity and modulus of rupture. The results are shown in Table 7. For each resin tested, multiple boards were prepared and in each case both an average and the standard deviation are reported. The results of this series of testing again demonstrate that the saccharide-based resin achieves better quality particleboard products than a traditional UF resin. Although the properties of the product prepared with the UF resin are acceptable in the industry, it is clear that the products prepared from the saccharide-based resin are more attractive. Perhaps more importantly, though, the UF content of the former products is 7 percent of the total product weight whereas the latter products achieve superior results with an isocyanate content of only 0.7 percent of the total product weight.

TABLE 7

Measured Physical Properties of Particleboards

| Resin Used to Prepare Particleboard | Modulus of Rupture (psi) | Modulus of Elasticity (psi) |
| --- | --- | --- |
| TABLE 1 Resin | 2,253.6 ± 142.8 | 439,385 ± 22,494 |
| UF Resin | 2,142.5 ± 204.8 | 381,599 ± 26,882 |

Example 4

Particleboard products prepared as in Example 3 above were wax treated and tested for swelling after exposure to moisture according to ASTM standard D1037. The results are depicted in FIG. 1 as a function of product density. The best performer—i.e., the product with the least water absorbancy as measured by swelling—was the particleboard product prepared from the saccharide-based resin. Wax-treated products prepared with the resin of the current invention displayed an edge swelling of less than 14 percent. Furthermore, the swelling was reasonably independent of product density from approximately 46 pcf to over 51 pcf. In contrast, wax-treated products prepared with the UF resin swelled more than 16 percent. In addition, this swelling was somewhat dependent of product density. Overall, then, the saccharide-based resin offers not only improved bonding, but also improved resistance to water-induced swelling.

Example 5

To demonstrate the efficacy of the saccharide-based resin in non-cellulosic applications, the composition of the resin disclosed in Table 1 was applied at a 10 percent resin load to a non-cellulosic recycled rigid polyurethane polymer that was comminuted to a small particle size. Five samples were prepared having an average density of 49.4 pcf. Other than the use of a ten percent resin load, all other preparatory procedures were identical to the method described earlier for preparation of particleboard. Prior attempts to produce a panel product from a mixture of the non-cellulosic polymer and the traditional UF resin had failed to achieve bonding. In contrast, the saccharide-based resin causes extremely strong bonding with the non-cellulosic polymer. The average internal bond strength achieved for the five samples tested were 464.5±43.9 psi, even better than the bonding achieved with lignocellulosic materials. Based upon this data, the saccharide-based resin disclosed clearly has applications outside the field of lignocellulosic and cellulosic materials.

Example 6

The saccharide-based resin disclosed in Table 1 above and the UF resin were also used to prepare medium density fiberboard (MDF) for comparative purposes. MDF fiber, unlike particleboard fiber, requires a higher level of processing to achieve high quality boards and panels. The fiber type may be attained by steam defibrillation, mechanical or chemomechanical processes and the like. A calculation was performed to yield a weight amount of furnish and resin required to form mats and subsequently, finished panels measuring 2'×2'×0.375" at 48 pcf density. Equal weight fiber amounts were then treated separately with the saccharide-based resin from Table 1 and the UF resin. The temperature, press time and pressure were the same as in the particleboard sample preparation. The mats were prepressed and then pressed to yield like thickness boards. After cooling, the boards were trimmed and evaluations began.

Ten boards were prepared from each resin and tested for internal bond strength, modulus of rupture and modulus of elasticity. The average results are compiled in Table 8. As Table 8 clearly indicates, MDF prepared from the saccharide-based resin outperformed MDF prepared from the UF resin in all categories. Average internal bond strength achieved for the MDF product prepared from the saccharide-based resin was almost three times the internal bond strength for the analogous product prepared from the UF resin. The modulus of rupture and modulus of elasticity were also significantly higher. Based on these results, the saccharide-based resin provides an MDF product that is clearly superior to the product obtained using a traditional UF resin.

TABLE 8

Measured Physical Properties of Medium Density Fiberboards

| Resin Used to Prepare MDF | Internal Bond (psi) | Modulus of Rupture (psi) | Modulus of Elasticity (psi) |
|---|---|---|---|
| TABLE 1 Resin | 229.9 | 5,327.5 | 492,011 |
| UF Resin | 83.4 | 3,492.5 | 434,086 |

The examples described above are provided to demonstrate the superior qualities of the resin of the present invention. The composition and products described herein are intended to be exemplary of the invention only and are not intended to limit the scope of the invention. For example, although a preferred resin embodiment utilizes a 60 percent solids content and 10 percent isocyanate, other formulations have been used successfully. For example, suitable bonding has been achieved with solids content as high as 85 percent by weight and as low as 30 percent by weight. Acceptable bonding has been achieved with resins formulated with polyol as low as 0.38 percent by weight and as high as 7.5 percent by weight of the entire resin composition.

Because the mechanism of bonding of lignocellulosic materials is in general poorly understood, it is difficult to definitively identify the chemical basis for the improvement achieved with the present invention. However, without limiting the scope of the invention, hemiacetal formation provides one plausible explanation for the enhanced bonding observed. Hemiacetals are well known as the product of the reaction between aldehydes and alcohols under acid catalyzed conditions. Lignocellulosic materials are well known to contain surface-terminal hydroxyl groups and saccharides such as corn syrup are well known to include aldehyde moieties

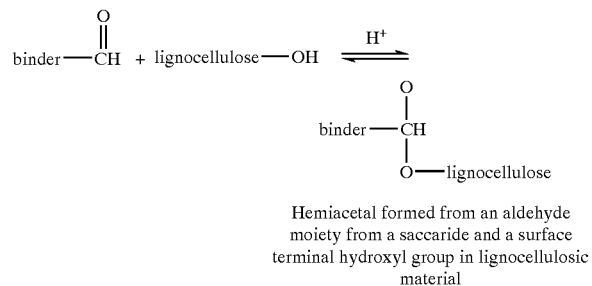

Hemiacetal formed from an aldehyde moiety from a saccharide and a surface terminal hydroxyl group in lignocellulosic material in the form of various aldohexoses. Given the presence of catalytic levels of wood acids, it is possible that hemiacetal formation between aldehyde groups on aldohexoses and hydroxyl groups on the lignocellulosic materials allow superior bonding between the resin and the wood fibers. Linking of aldohexoses may then occur by urethane formation between the hydroxyl groups on the aldohexoses and the isocyanate moieties on the polyisocyanates. The role of the polyol appears to be to stabilize the resin by retarding the reaction between the water and the isocyanate.

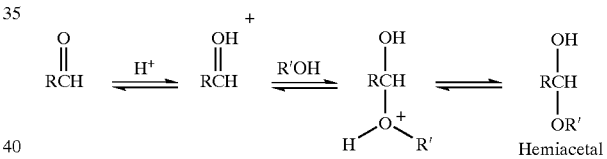

It is currently believed that the polyol acts as a surfactant and effectively separates the water and isocyanate components, thereby delaying the reaction between them.

The forgoing detailed description and examples have been given for clarity of understanding only. No unnecessary limitations are to be understood therefrom. While preferred embodiments of the present invention have been shown and described, it will be understood that variations can be made to the preferred embodiments without departing from the scope of, and which are equivalent to, the present invention.

What is claimed is:

1. A resin for binding lignocellulosic products comprising:
   a. one or more saccharides;
   c. one or more isocyanates;
   b. one or more isocyanates;
   d. water, wherein the one or more polyols comprise 1,2-propylene glycol.

2. The resin of claim 1 wherein the one or more saccharides are present at a concentration of between about 25 and about 65 weight percent of the resin, the one or more isocyanates are present at a concentration of between about 1 and about 30 weight percent of the resin, and the one or more polyols are present at a concentration of between about 1 and about 10 weight percent of the resin.

3. The resin of claim 1 wherein the one or more saccharides are present at a concentration of between about 50 and about 65 weight percent of the resin, the one or more isocyanates are present at a concentration of between about 5 and about 20 weight percent of the resin, and the one or more polyols are present at a concentration of between about 3 and about 5 weight percent of the resin.

4. The resin of claim 1 wherein the one or more saccharides comprise a polysaccharide.

5. The resin of claim 4 wherein the polysaccharide comprises corn syrup.

6. The resin of claim 1 wherein the one or more isocyanates comprise a polyisocyanate.

7. The resin of claim 6 wherein the polyisocyanate comprises a diphenylmethane diisocyanate.

8. The resin of claim 6 wherein the polyisocyanate is present at a concentration of about 7.5 weight percent of the resin or less.

9. A method for preparing an aqueous resin for binding lignocellulosic products comprising
   a. mixing one or more saccharides with one or more isocyanates; and
   b. then mixing the one or more saccharides and the one or more isocyanates with water.

10. The method of claim 9 wherein the one or more saccharides comprise a polysaccharide.

11. The method of claim 10 wherein the polysaccharide comprises corn syrup.

12. The method of claim 9 further comprising mixing the one or more isocyanates with one or more polyols prior to step (a), wherein the one or more polyols comprise a polyol selected from the group consisting of ethylene glycol; 1,2-propylene glycol; 1,3-propylene glycol; hexane 1,6-diol; 2 methyl-1,3-propanediol; glycerol; mannitol; sorbitol; diethylene glycol; triethylene glycol; polyethylene glycols; polypropylene glycols; and butylene, dibutylene, and polybutylene glycols.

13. A composite product prepared from a resin comprising:
   a. one or more saccharides;
   b. one or more isocyanates;
   c. one or more polyols; and
   d. water,
wherein the one or more polyols comprise a polyol selected from the group consisting of ethylene glycol; 1,2-propylene glycol; 1,3-propylene glycol; hexane 1,6-diol; 2 methyl-1,3-propanediol; glycerol; mannitol; sorbitol; diethylene glycol; triethylene glycol; polyethylene glycols; polypropylene glycols; and butylene, dibutylene, and polybutylene glycols, and wherein the composite product is a composite wood product.

14. The composite wood product of claim 13 wherein the one or more saccharides are present at a concentration of between about 25 and about 65 weight percent of the resin, the one or more isocyanates are present at a concentration of between about 1 and about 30 weight percent of the resin, and the one or more polyols are present at a concentration of between about 1 and about 10 weight percent of the resin.

15. The composite wood product of claim 13 wherein the one or more saccharides are present at a concentration of between about 50 and about 65 weight percent of the resin, the one or more isocyanates are present at a concentration of between about 5 and about 20 weight percent of the resin, and the one or more polyols are present at a concentration of between about 3 and about 5 weight percent of the resin.

16. The composite wood product of claim 13 wherein the one or more saccharides comprise a polysaccharide.

17. The composite wood product of claim 16 wherein the polysaccharide comprises corn syrup.

18. A composite product prepared from a resin comprising:
   a. one or more saccharides;
   b. one or more isocyanates;
   c. one or more polyols; and
   d. water,
wherein the composite product is a composite wood product and wherein the one or more polyols comprise 1,2-propylene glycol.

19. The composite wood product of claim 13 wherein the one or more isocyanates comprise a polyisocyanate.

20. The composite wood product of claim 19 wherein the polyisocyanate comprises a diphenylmethane diisocyanate.

21. The composite wood product of claim 19 wherein the polyisocyanate is present at a concentration of about 7.5 weight percent of the rosin or less.

22. The composite wood product of claim 13 wherein the composite wood product comprises a particleboard.

23. The composite wood product of claim 13 wherein the composite wood product comprises a medium density fiberboard.

24. A method for preparing a composite product, comprising: preparing a binder comprising
   a. one or more saccharides;
   b. one or more isocyanates;
   c. one or more polyols; and
   d. water,
wherein the one or more polyols comprise a polyol selected from the group consisting of ethylene glycol; 1,2-propylene glycol; 1,3-propylene glycol; hexane 1,6-diol, 2 methyl-1,3-propanediol; glycerol; mannitol; sorbitol; diethylene glycol; triethylene glycol; polyethylene glycols; polypropylene glycols; and butylene, dibutylene, and polybutylene glycols; and applying the resin to particulate to form the composite product.

25. The method of claim 24 wherein the particulate comprises lignocellulosic material.

26. The method of claim 24 wherein the particulate comprises polyurethane, plastic, organic polymer systems, or metal.

27. The method of claim 25 wherein the composite product is plywood, oriented strand board, particleboard, or medium density fiberboard.

* * * * *

UNITED STATES PATENT AND TRADEMARK OFFICE
CERTIFICATE OF CORRECTION

PATENT NO.   : 6,822,042 B2
DATED        : November 23, 2004
INVENTOR(S)  : Charles Capps It is certified that error appears in the above-identified patent and that said Letters Patent is hereby corrected as shown below:

Column 12,
Line 15, add -- H -- after "O" in the formula.
Line 57, delete "c. one or more isocyanates;"
Between lines 58 and 59, add -- c. one or more polyols; and --

Column 14,
Line 28, replace "rosin" by -- resin --

Signed and Sealed this

First Day of March, 2005

JON W. DUDAS
*Director of the United States Patent and Trademark Office*